United States Patent [19]

Linquist

[11] 3,927,866

[45] Dec. 23, 1975

[54] PNEUMATIC BLOW GUN FOR INSTALLING FISHING LINE, MEASURING TAPE AND POLYETHYLENE PULL LINE IN ELECTRICAL CONDUIT

[75] Inventor: Wayne A. Linquist, Rockford, Ill.

[73] Assignee: Greenlee Bros. and Co., Rockford, Ill.

[22] Filed: Oct. 11, 1974

[21] Appl. No.: 513,989

[52] U.S. Cl. ............................................ 254/134.4
[51] Int. Cl.² ........................................ E21C 29/16
[58] Field of Search.... 254/134.4, 134.3 FT, 190 R; 15/104.06 R, 104.06 A

[56] References Cited

UNITED STATES PATENTS

| 3,301,531 | 1/1967 | Corsiglia | 254/134.4 |
| 3,689,031 | 9/1972 | Ruddick et al. | 254/134.4 |
| 3,793,732 | 2/1974 | Hamrick | 254/134.4 |

*Primary Examiner*—M. Henson Wood, Jr.
*Assistant Examiner*—David M. Mitchell
*Attorney, Agent, or Firm*—James H. Bower; Mitchell J. Hill

[57] ABSTRACT

The disclosure relates to a pneumatic blow gun for installing fish line, measuring tape and polyethylene pull line in electrical conduit.

4 Claims, 5 Drawing Figures

U.S. Patent   Dec. 23, 1975   3,927,866
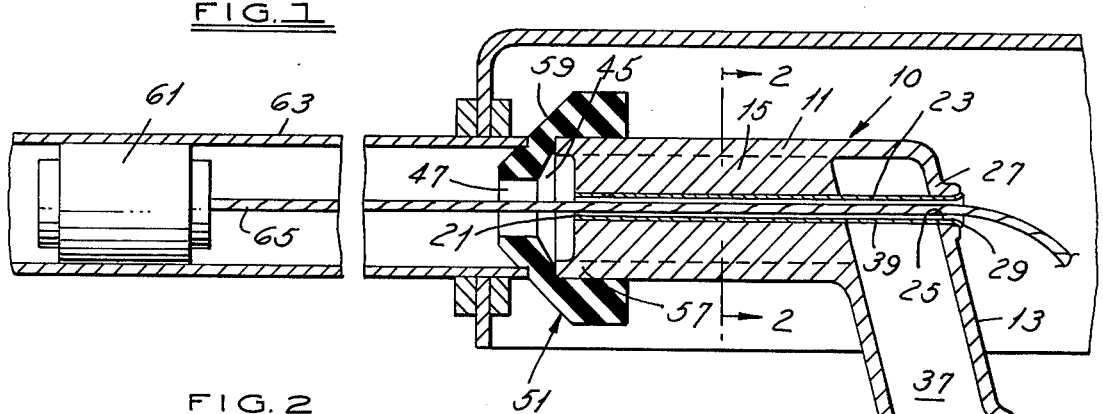
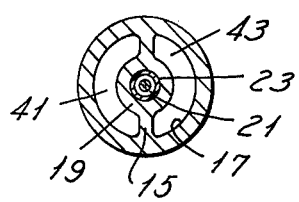
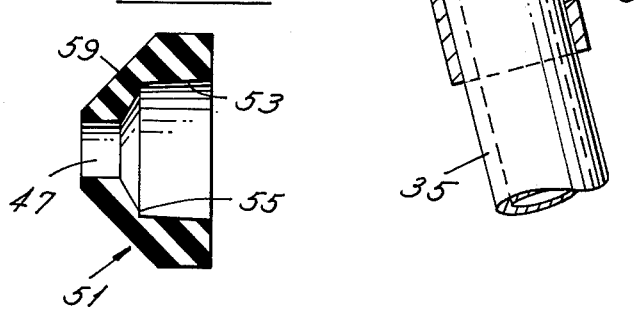
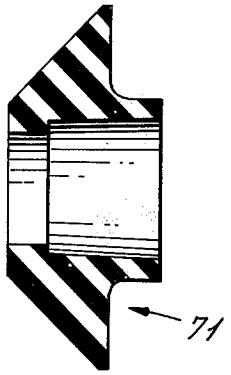
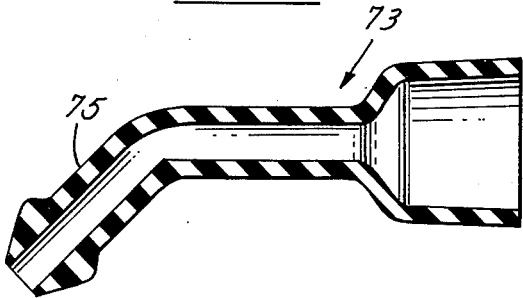

PNEUMATIC BLOW GUN FOR INSTALLING FISHING LINE, MEASURING TAPE AND POLYETHYLENE PULL LINE IN ELECTRICAL CONDUIT

BACKGROUND OF THE INVENTION AND DESCRIPTION OF THE PRIOR ART

Prior art shows a fitting which resembles a pneumatic blow gun comprising a right angled bend and two straight leg portions extending from the bend as shown in U.S. Pat. No. 3,301,531. The opening for the cord is in the elbow or right angled bend portion and in the mainstream of the air channel. Consequently the cord is threaded through the opening in the blow gun by air under positive gauge pressure only when air can build up behind the plug to force it through a conduit.

SUMMARY OF THE INVENTION

This invention relates to a pneumatic blow gun for installing fish line, measuring tape and polyethylene pull line in electrical conduit by providing a visual and consequently physical control of the line being fed through the conduit. This is accomplished by providing a venturi throat effect in the blending area where the inside pressurized system meets the atmospheric air.

DESCRIPTION OF THE DRAWINGS

FIG. 1 is a fragmentary sectional view on an enlarged scale showing the blow gun applied to one end of an electrical conduit;

FIG. 2 is a cross-sectional view taken along line 2—2 of FIG. 1;

FIG. 3 is a sectional view on an enlarged scale showing an adapter cone for use in 1¼ inch through 2½ inch diameter conduit;

FIG. 4 is a sectional view on an enlarged scale showing an adapter cone for use in 3 inch through 4 inch diameter conduit; and FIG. 5 is a sectional view on an enlarged scale showing an adapter cone for use in ½ inch through 1 inch diameter conduit.

DESCRIPTION

Referring to the drawings, FIG. 1 illustrates a typical blow gun 10 comprising a main body portion 11 and a leg portion 13 extending transversely therefrom. The main body portion 11 comprises an internal rib 15 which connects diametrically opposed internal walls 17 of the main body portion to form two channels 41 and 43. The rib 15 is enlarged at the center, shown in FIG. 2 as 19, to provide for an axial bore or opening 21 extending axially therethrough, as shown in FIG. 1, for a metal guide tube 23 to be inserted therein.

The guide tube 23 extends through the axial bore 21 and also through an opening 25 of the trigger portion 27 of blow gun 10. The edge 29 of guide tube 23 is rolled to form a flanged seat 31 on the trigger portion 27 to prevent the tube from sliding through the axial bore 23; moreover, the tube 23 is cemented to the bore 21 to prevent the tube from sliding therethrough.

Leg portion 13 comprises an enlarged diameter portion 33 to accommodate a hose 35 which is connected to a blower. In case of a vacuum system, the hose is not connected and the leg portion 13 of blow gun 10 is opened to atmospheric pressure allowing ambient air in the bore 37.

In the preferred embodiment shown in FIG. 1, tube 23 extends from the rib 15 to the opening 25 allowing for the bridge portion 39 to span the length between the supports. It is apparent that with a closed internal pressure system, air is forced through the bore 37 and separated to pass through two channels 41 and 43 into the recess or blending area 45 and through the restricted opening 47 of the adapter cone 51. A line 65 is adapted to be threaded through bore of tube 23 and attached to the piston 61. The complete assembly, including the proper size cone attached to the end portion 57 of the blow gun is physically held over the opening of the conduit. The pressure inside the bore 37 and channels 41 and 43 is increased above atmospheric by using a blower means.

The increased pressure of the air flowing through the two channels 41 and 43 into the blending area 45 and through the restricted opening 47 of the cone provides a venturi effect whereby the increased velocity at the opening 47 causes a decrease in pressure in the blending area 45. Thus, the pressure in the bore of tube 23 is greater than the pressure adjacent the outlet of the guide tube 23. Consequently, the line 65 does not cause any appreciable drag effect and the line is payed out rapidly without any hindering effect. The line is payed out as long as the piston is moved through the conduit until the piston reaches the final destination. However, the line 65 can be stopped at any time by applying a thumb or some object and pressing it against the opening 29 of tube 23.

Thus, it can readily be apparent that a line can be fished through an electrical conduit by utilizing the blow gun in conjunction with a blower to move the piston along the conduit and pull the line through the conduit. The length of the line can be a drag unless the invention described is used to effectively decrease the frictional line drag.

FIG. 4 shows an adapter cone 71 of similar design of that shown in FIG. 3 except that it is larger in size and is used for electrical conduits 3 through 4 inches in diameter.

FIG. 5 shows an adapter cone 73 used for electrical conduits ½ inch through 1 inch in diameter. Its resilient nose portion 75 allows for easier flexibility in difficult areas.

The invention is claimed as follows:

1. A pneumatic blow gun comprising:
  a. a main body portion including
    1. a tubular wall;
    2. an outer end;
    3. an inner end; and
    4. a longitudinal axis extending through said main tubular body portion;
  b. a leg portion extending from said main tubular body portion at said inner end;
  c. rib means connecting the inner walls of said main tubular body portion, said rib means forming a channel means;
  d. a guide tube extending through said axis of said main tubular body portion and said rib means, said guide tube extending through the wall at said inner end of the main body portion; and,
  e. a centrally open adapter cone shaped and dimensioned to detachably encircle said outer end of said main body portion to form a seal therewith.

2. The invention as defined in claim 1, wherein said rib means in said main body portion comprises a section diametrically connecting the inner walls forming two air chambers in said main body portion of said pneumatic blow gun.

3. The invention as defined in claim 1, wherein said guide tube extending through said wall is rolled back to form a circumferential seat.

4. The invention as defined in claim 1 wherein the orifice of said centrally open adapter cone is smaller than the inner diameter of said main body portion defining a venturi throat.

* * * * *